US012779744B2

(12) United States Patent
Larsson et al.

(10) Patent No.: US 12,779,744 B2
(45) Date of Patent: Nov. 3, 2026

(54) METHOD FOR PRODUCING CELLULOSE PRODUCTS AND A ROTARY FORMING MOULD SYSTEM

(71) Applicant: PulPac AB, Västra Frölunda (SE)

(72) Inventors: Ove Larsson, Västra Frölunda (SE); Linus Larsson, Gothenburg (SE); Niklas Ekstrand, Lerum (SE)

(73) Assignee: PulPac AB, Västra Frölunda (SE)

(*) Notice: Subject to any disclaimer, the term of this patent is extended or adjusted under 35 U.S.C. 154(b) by 0 days.

(21) Appl. No.: 17/636,988

(22) PCT Filed: Aug. 27, 2020

(86) PCT No.: PCT/EP2020/073910
§ 371 (c)(1),
(2) Date: Feb. 21, 2022

(87) PCT Pub. No.: WO2021/037946
PCT Pub. Date: Mar. 4, 2021

(65) Prior Publication Data
US 2022/0355516 A1 Nov. 10, 2022

(30) Foreign Application Priority Data
Aug. 30, 2019 (SE) .................................... 1950989-2

(51) Int. Cl.
*B29C 43/00* (2006.01)
*B29C 43/08* (2006.01)
(Continued)

(52) U.S. Cl.
CPC .............. *B29C 43/08* (2013.01); *B29C 43/10* (2013.01); *B29C 43/3642* (2013.01);
(Continued)

(58) Field of Classification Search
CPC ............ B29C 43/10; B29C 2043/3472; B29C 2043/3466; B29K 2001/00
See application file for complete search history.

(56) References Cited

U.S. PATENT DOCUMENTS 2,813,303 A * 11/1957 Stevenson ........... B29C 37/0021 425/418
3,575,749 A * 4/1971 Kroyer .................. D04H 1/645 425/130
(Continued)

FOREIGN PATENT DOCUMENTS

EP 1901899 A1 3/2008
EP 2692499 A1 2/2014
(Continued)

OTHER PUBLICATIONS https://web.archive.org/web/20180509082042/https://engineering.purdue.edu/~abe305/moisture/html/page9.htm (Year: 2018).*
(Continued)

*Primary Examiner* — JaMel M Nelson
*Assistant Examiner* — Andrés E. Behrens, Jr.
(74) *Attorney, Agent, or Firm* — MARSHALL, GERSTEIN & BORUN LLP

(57) ABSTRACT

A method for forming cellulose products from an air-formed cellulose blank having a base and one or more forming moulds attached to the base which is arranged to rotate around a rotational axis, wherein each forming mould comprises a first mould part and a corresponding second mould part wherein during rotational movement of the base around the rotational axis each first mould part is arranged to engage with its corresponding second mould part in a pressing direction. The method comprises arranging the cellulose blank in a position between a first mould and the second mould forming the cellulose products in the rotary forming mould system, by applying a forming pressure between the
(Continued)

first mould and its corresponding second mould through an engaging movement of the first mould in relation to its corresponding second mould in the pressing direction, wherein the forming moulds are rotating with the base around the rotational axis.

11 Claims, 6 Drawing Sheets

(51) Int. Cl.

| | |
|---|---|
| ***B29C 43/10*** | (2006.01) |
| ***B29C 43/36*** | (2006.01) |
| ***B29C 43/40*** | (2006.01) |
| ***B29C 43/52*** | (2006.01) |
| ***B31B 50/00*** | (2017.01) |
| *B29C 33/00* | (2006.01) |
| *B29C 33/40* | (2006.01) |
| *B29C 43/34* | (2006.01) |
| *B29K 1/00* | (2006.01) |
| *B29L 31/00* | (2006.01) |
| *B29L 31/56* | (2006.01) |
| *B31B 50/59* | (2017.01) |
| *B31B 100/00* | (2017.01) |
| *B31B 110/00* | (2017.01) |
| *B31B 110/10* | (2017.01) |
| *B31B 110/20* | (2017.01) |

(52) U.S. Cl.

CPC .............. *B29C 43/40* (2013.01); *B29C 43/52* (2013.01); *B29C 33/00* (2013.01); *B29C 33/405* (2013.01); *B29C 43/00* (2013.01); *B29C 2043/3472* (2013.01); *B29C 2043/3652* (2013.01); *B29C 2793/0009* (2013.01); *B29C 2793/0081* (2013.01); *B29K 2001/00* (2013.01); *B29L 2031/56* (2013.01); *B29L 2031/712* (2013.01); *B29L 2031/7174* (2013.01); *B31B 50/00* (2017.08); *B31B 50/592* (2018.05); *B31B 2100/0024* (2017.08); *B31B 2110/00* (2017.08); *B31B 2110/10* (2017.08); *B31B 2110/20* (2017.08)

(56) References Cited

U.S. PATENT DOCUMENTS 4,014,635 A * 3/1977 Kroyer .................. B02C 13/288 425/83.1
4,060,360 A * 11/1977 Tapp ...................... D01G 25/00 425/83.1
4,102,963 A * 7/1978 Wood ....................... B27N 3/14 264/518
4,152,566 A * 5/1979 Magerle .............. B29C 66/8226 156/556
4,494,278 A * 1/1985 Kroyer ................... D01G 25/00 264/518
4,776,782 A 10/1988 Murayama et al.
4,806,190 A * 2/1989 Sorenson ................. D04H 5/08 156/229
5,471,712 A * 12/1995 Kroyer .................. B21F 27/005 140/9
5,476,617 A * 12/1995 English .................... B27N 5/00 264/319
5,961,763 A * 10/1999 Makoui ............. A61F 13/15699 156/290
6,042,754 A * 3/2000 Yang ....................... B29C 43/08 264/297.6
6,083,586 A * 7/2000 Andersen ................ C04B 26/02 106/206.1
11,020,883 B2 * 6/2021 Larsson .................... B30B 5/02
11,717,993 B2 * 8/2023 Larsson ................. D21H 21/18 264/257
2002/0025356 A1 * 2/2002 Ingram ................... B29C 43/42 425/348 R
2003/0086973 A1 * 5/2003 Sowden ................... A23G 3/04 264/328.2
2003/0124183 A1 * 7/2003 Sowden ................ B30B 11/005 264/109
2006/0286192 A1 * 12/2006 Mattice ................... B29C 43/18 425/353
2008/0108772 A1 * 5/2008 Oksman ................... C08J 3/005 527/314
2009/0241831 A1 * 10/2009 Jezzi ...................... D04H 1/425 118/308
2009/0267272 A1 * 10/2009 Takano ................. B29C 31/048 264/555
2014/0010906 A1 * 1/2014 Yonesato ................ B29C 43/34 425/144
2017/0144361 A1 * 5/2017 Hills ..................... B29C 51/266
2019/0070819 A1 * 3/2019 Larsson .................. B31B 50/59
2019/0118426 A1 * 4/2019 Larsson .................. B29C 43/52
2022/0176598 A1 * 6/2022 Högblom .................. D21J 5/00
2025/0369193 A1 * 12/2025 Ljungberg .............. B29C 33/46
2026/0008248 A1 * 1/2026 Ekstrand .................. B27N 3/04

FOREIGN PATENT DOCUMENTS

SE 539948 C2 * 2/2018 ............... B27N 3/04
SE 1750313 A1 9/2018
WO WO-2005095086 A1 10/2005
WO WO-2006138089 A1 12/2006
WO WO-2007034845 A1 3/2007
WO WO-2011049634 A1 4/2011
WO WO-2014142714 A1 * 9/2014 ............... B27N 3/00
WO WO-2016120751 A1 * 8/2016 ............. B29C 43/08
WO WO-2017160218 A1 9/2017
WO WO-2018146217 A1 8/2018

OTHER PUBLICATIONS https://web.archive.org/web/20170412011232/https://en.wikipedia.org/wiki/Dry_basis (Year: 2017).*
https://web.archive.org/web/20190724225547/http://www.cabri.org/guidelines/plant/502ap1.html (Year: 2019).*
Han JS. Properties of nonwood fibers. Proceedings of the Korean society of wood science and technology annual meeting. Seoul: The Korean Society of Science and Technology Seoul; 1998. p. 3-12 (Year: 1998).*
Hurter AM. Utilization of annual plants and agricultural residues for the production of pulp and paper. In: Griggs WH, editor. Proceedings of Tappi Pulping Conference. Georgia: TAPPI Press; 1988. p. 139-60 (Year: 1988).*
International Search Report and Written Opinion for Application No. PCT/EP2020/073910, dated Dec. 1, 2020.
Office Action in corresponding Swedish patent application No. 1950989-2, dated Feb. 28, 2020.
Office Action, European Patent Application No. 20764961.7, dated Jul. 18, 2024, 7 pages.
Third Party Observations, European patent application No. 20764961.7, dated Nov. 27, 2024.

* cited by examiner

METHOD FOR PRODUCING CELLULOSE PRODUCTS AND A ROTARY FORMING MOULD SYSTEM

TECHNICAL FIELD

The present disclosure relates to a method for producing cellulose products from an air-formed cellulose blank structure in a rotary forming mould system. The disclosure further relates to a rotary forming mould system.

BACKGROUND

Cellulose fibres are often used as raw material for producing or manufacturing products. Products formed of cellulose fibres can be used in many different situations where there is a need for having sustainable products. A wide range of products can be produced from cellulose fibres and a few examples are disposable plates and cups, cutlery, lids, bottle caps, coffee pods, blank structures, and packaging materials.

Forming moulds are commonly used when manufacturing cellulose products from raw materials including cellulose fibres, and traditionally the cellulose products have been produced with wet-forming techniques. A material commonly used for cellulose fibre products is wet moulded pulp. Wet moulded pulp has the advantage of being considered as a sustainable packaging material, since it is produced from biomaterials and can be recycled after use. Consequently, wet moulded pulp has been quickly increasing in popularity for different applications. Wet moulded pulp articles are generally formed by immersing a suction forming mould into a liquid or semi liquid pulp suspension or slurry comprising cellulose fibres, and when suction is applied, a body of pulp is formed with the shape of the desired product by fibre deposition onto the forming mould. With all wet-forming techniques, there is a need for drying of the wet moulded product, where the drying is a very time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products is the forming of cellulose fibres without using wet-forming techniques. Instead of forming the cellulose products from a liquid or semi liquid pulp suspension or slurry, an air-formed cellulose blank is used. The air-formed cellulose blank is inserted into a forming mould and during the forming of the cellulose products the cellulose blank is subjected to a high forming pressure and a high forming temperature. The forming systems used for forming cellulose products from air-formed cellulose blank structures are limited in production capacity, since the forming of the cellulose products take place in forming systems with relatively long cycle times. The high pressure needed when forming the cellulose products is limiting the number of products that can be formed in a single pressure-forming step.

There is thus a need for an improved method and system for forming cellulose products from an air-formed cellulose blank structure.

SUMMARY

An object of the present disclosure is to provide a method for producing cellulose products from an air-formed cellulose blank structure and a rotary forming mould system where the previously mentioned problems are avoided. This object is at least partly achieved by the features of the independent claims. The dependent claims contain further developments of the method for producing cellulose products and the rotary forming mould system.

The disclosure concerns a method for forming cellulose products from an air-formed cellulose blank structure in a rotary forming mould system, where the rotary forming mould system comprises a base structure and one or more forming moulds attached to the base structure. The base structure is arranged to rotate around a rotational axis extending in an axial direction. Each forming mould comprises a first mould part and a corresponding second mould part, where during rotational movement of the base structure around the rotational axis each first mould part is arranged to engage with its corresponding second mould part in a pressing direction. The method comprises the steps; providing the air-formed cellulose blank structure; arranging the cellulose blank structure in a position between a first mould part and its corresponding second mould part; forming the cellulose products from the cellulose blank structure in the rotary forming mould system, by applying a forming pressure on the cellulose blank structure between the first mould part and its corresponding second mould part through an engaging movement of the first mould part in relation to its corresponding second mould part in the pressing direction. During forming, the one or more forming moulds are rotating with the base structure around the rotational axis.

Advantages with these features are that the forming of the cellulose products from the air-formed cellulose blank structure can be made with an increased production speed, since through the rotational movements of the base structure together with the engagement of the mould parts in the pressing direction the throughput of the system increases compared to traditional forming methods. In traditional forming methods used, where a reciprocating stand-based forming mould structure with a forming cavity is used, the feeding of the cellulose blank structure to the forming mould and the removal of the formed cellulose products from the forming mould are limiting the system throughput. Further, when using such a traditional forming method, the high pressure needed when forming the cellulose products is limiting the number of products that can be formed in a single pressure forming step. The rotary forming of cellulose products is providing a way to overcome this problem since no large mass has to be accelerated and single products can be produced with high speed in combined continuous rotating and reciprocating movements.

According to an aspect of the disclosure, the method further comprises the steps during forming; heating the cellulose blank structure to a forming temperature in the range of 100° C. to 300° C.; and applying the forming pressure on the heated cellulose blank structure, where the forming pressure is at least 1 MPa, preferably 4-20 MPa. Forming of the cellulose products within the temperature and pressure ranges are securing an efficient fibril aggregation through hydrogen bonds of the cellulose fibres in the cellulose blank structure.

According to another aspect of the disclosure, the pressing direction is arranged parallel to, or essentially parallel to, the axial direction. With the parallel, or essentially parallel, orientation of the pressing direction in relation to the axial direction, the system and method can be designed with a compact layout in a radial direction.

According to an aspect of the disclosure, the pressing direction is arranged at an angle in relation to the axial direction, where the angle is in the range 0°-180°. The pressing direction may thus differ depending on the design of the system. When the pressing direction is arranged at an angle in relation to the axial direction, the system and method can be designed with a more compact design in the axial direction.

According to another aspect of the disclosure, the first mould part and/or the second mould part comprises a deformation element arranged to exert the forming pressure on the cellulose blank structure during forming of the cellulose products. The deformation element is providing an efficient forming of the cellulose product, especially if having complex shapes or structural reinforcements.

According to a further aspect of the disclosure, the forming pressure is an isostatic forming pressure of at least 1 MPa, preferably 4-20 MPa. The isostatic forming pressure is providing an efficient forming of cellulose products having complex shapes, where the pressure distribution in the forming mould during the forming of the cellulose product is equal in all directions.

According to an aspect of the disclosure, the air-formed cellulose blank structure has a dry basis weight in the range of 200-3000 $g/m^2$, preferably 300-3000 $g/m^2$, and more preferably 400-3000 $g/m^2$. The air-formed cellulose blank structure with these properties are suitable for the forming of three-dimensional cellulose products. The cellulose blank structure is a relatively thick and fluffy structure compared to traditional wet-laid paper or tissue structures. The bulky cellulose blank structure is compacted during the forming process, and the cellulose fibres in the three-dimensional cellulose products are strongly bonded to each other with hydrogen bonds, providing a stiff compacted three-dimensional product structure.

The disclosure further concerns a rotary forming mould system arranged for forming cellulose products from an air-formed cellulose blank structure. The rotary forming mould system comprises a base structure and one or more forming moulds attached to the base structure, where the base structure is arranged to rotate around a rotational axis extending in an axial direction. Each forming mould comprises a first mould part and a corresponding second mould part, where during rotational movement of the base structure around the rotational axis each first mould part is arranged to engage with its corresponding second mould part in a pressing direction.

During forming of the cellulose products, the rotary forming mould system is configured to applying a forming pressure on the cellulose blank structure between the first mould part and its corresponding second mould part through an engaging movement of the first mould part in relation to its corresponding second mould part in the pressing direction. During forming, the one or more forming moulds are configured to rotating with the base structure around the rotational axis.

Advantages with these features are that the rotary forming mould system is providing an efficient forming arrangement for forming the cellulose products from the air-formed cellulose blank structure. The system further provides an increased production speed, since through the rotational movements of the base structure together with the engagement of the mould parts in the pressing direction the throughput of the system increases compared to traditional forming methods.

According to an aspect of the disclosure, the pressing direction is arranged parallel to, or essentially parallel to, the axial direction. With the parallel, or essentially parallel, orientation of the pressing direction in relation to the axial direction, the system can be designed with a compact layout in a radial direction.

According to another aspect of the disclosure, the pressing direction is arranged at an angle in relation to the axial direction, where the angle is in the range 0°-180°. The pressing direction may thus differ for different constructions of the rotary forming mould system depending on the design of the system. When the pressing direction is arranged at an angle in relation to the axial direction, the system can be designed with a more compact design in the axial direction.

According to an aspect of the disclosure, the first mould part and/or the second mould part comprises a deformation element arranged to exert the forming pressure on the cellulose blank structure during forming of the cellulose products. The deformation element is providing an efficient forming of the cellulose product, especially if having complex shapes or structural reinforcements.

According to another aspect of the disclosure, the rotary forming mould system further comprises an actuating mechanism arranged for moving each first mould part and/or each second mould part in relation to each other. The actuating mechanism is moving the first and/or the second mould part in relation to each other between different positions, such as a feeding position where the cellulose blank is arranged between the mould parts, a pressing position where the cellulose products are formed in the forming moulds, and a removal position where the formed cellulose products are removed from the forming moulds.

According to a further aspect of the disclosure, each first mould part or second mould part is movably arranged in the pressing direction. The actuating mechanism comprises a movable actuating rod for each first mould part or each second mould part, and the actuating mechanism further comprises a stationary cam unit arranged for displacing each actuating rod in the pressing direction during rotational movement of the base structure around the rotational axis. The actuating rod and the stationary cam unit is providing a reliable and simple construction of the actuating mechanism.

According to an aspect of the disclosure, each first mould part and/or second mould part is movably arranged in the pressing direction. The actuating mechanism comprises an actuator for each first mould part arranged for displacing the first mould part in the pressing direction during rotational movement of the base structure around the rotational axis, and/or an actuator for each second mould part arranged for displacing the second mould part in the pressing direction during rotational movement of the base structure around the rotational axis. The actuators are providing an efficient actuating mechanism as an alternative solution, and the actuators may be actuated mechanically, electrically, or hydraulically.

According to another aspect of the disclosure, the rotary forming mould system further comprises a feeding unit arranged for feeding the cellulose blank structure to the one or more forming moulds. The feeding unit comprises a rotating feeding arm arranged for transporting the cellulose blank structure to the one or more forming moulds. The feeding unit with the rotating feeding arm is providing an efficient feeding of the cellulose blank structure to the forming moulds.

According to an aspect of the disclosure, the air-formed cellulose blank structure has a dry basis weight in the range of 200-3000 $g/m^2$, preferably 300-3000 $g/m^2$, and more preferably 400-3000 $g/m^2$, providing suitable properties of the air-formed cellulose blank structure for forming cellulose products in the forming mould system.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
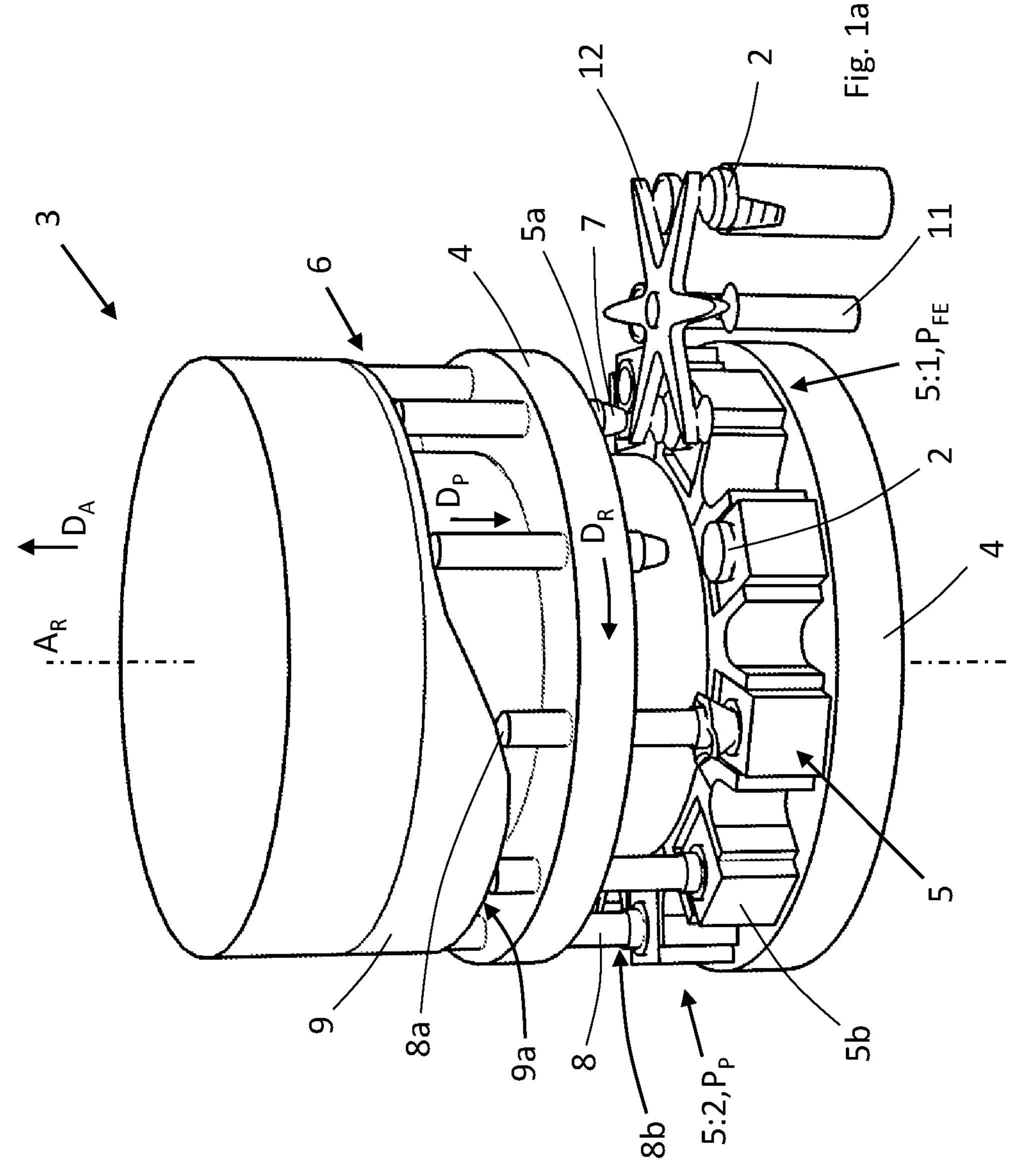
FIG. 1*a-b* show schematically, in perspective views a rotary forming mould system according to the disclosure.
Figure 1B:
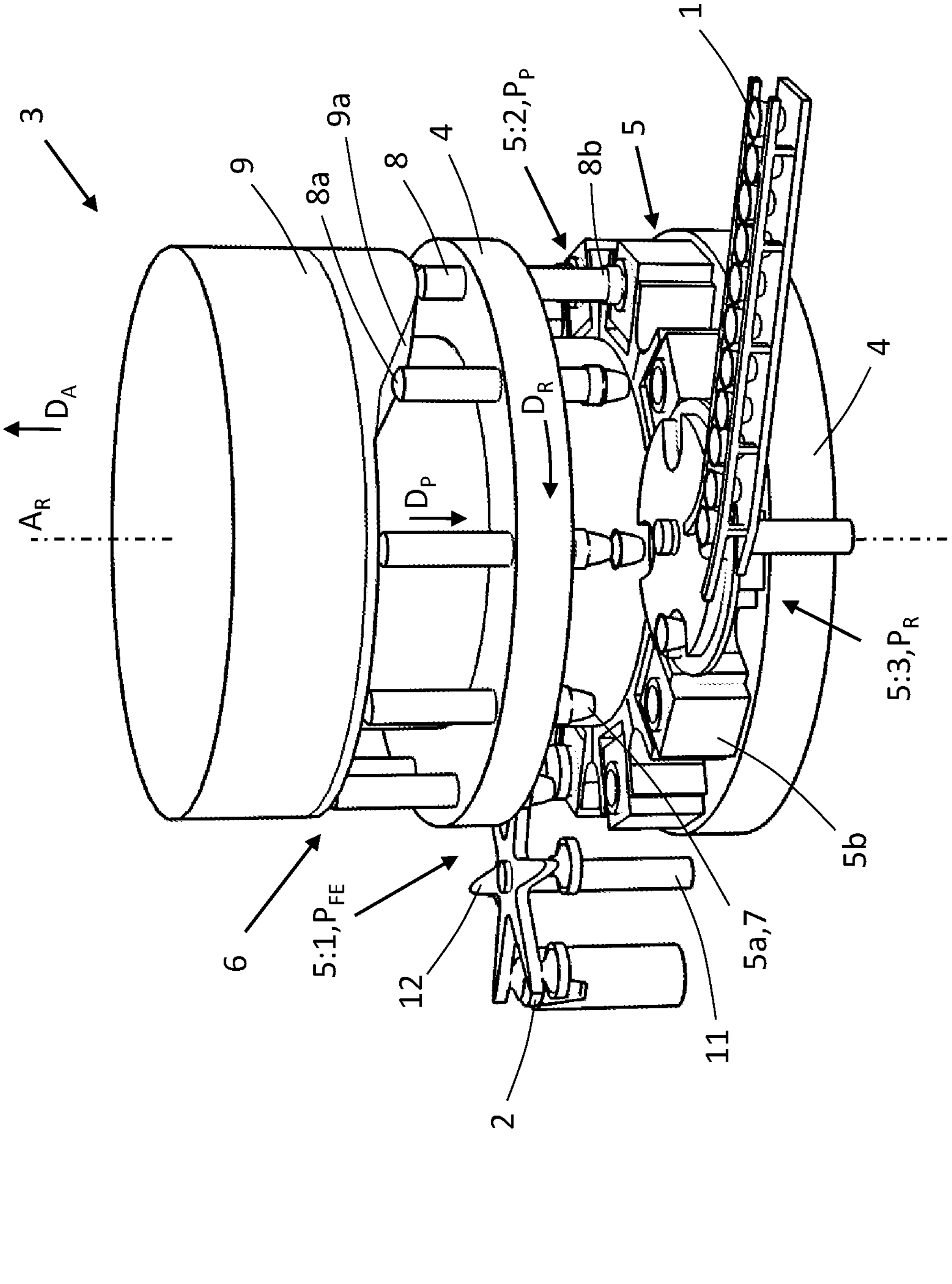
Figure 2A:
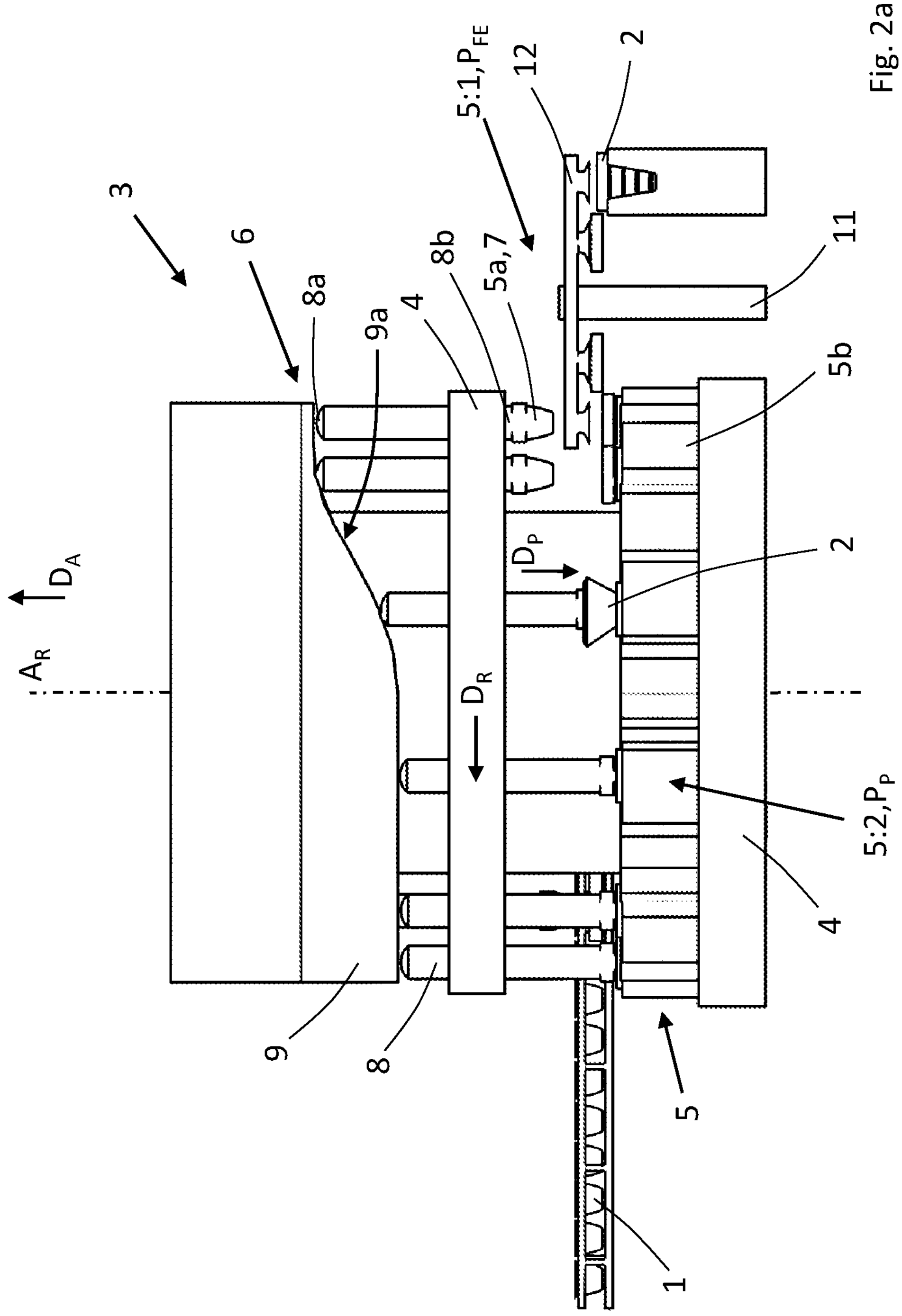
FIG. 2*a-b* show schematically, in side views the rotary forming mould system according to the disclosure.
Figure 2B:
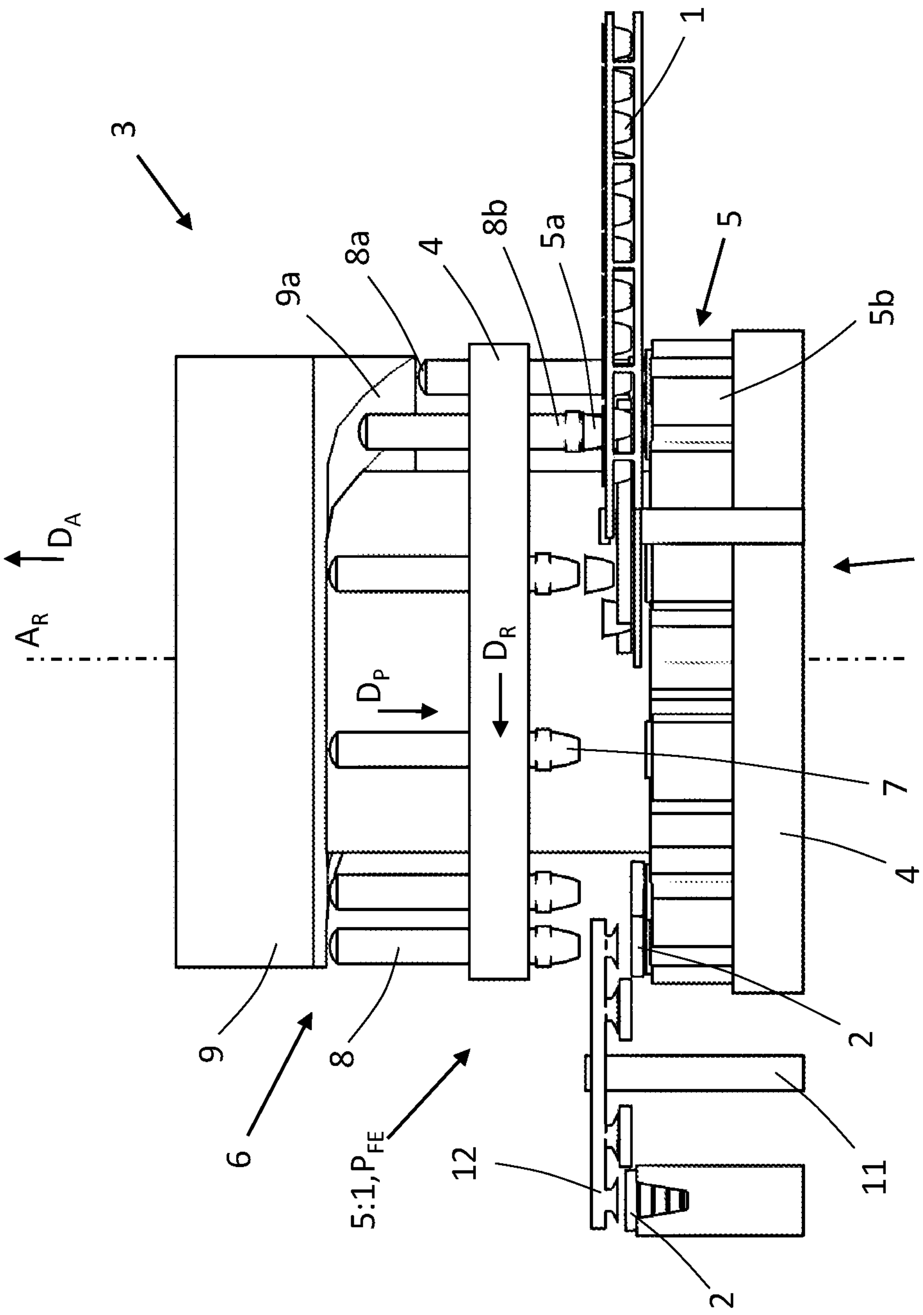
Figure 3:
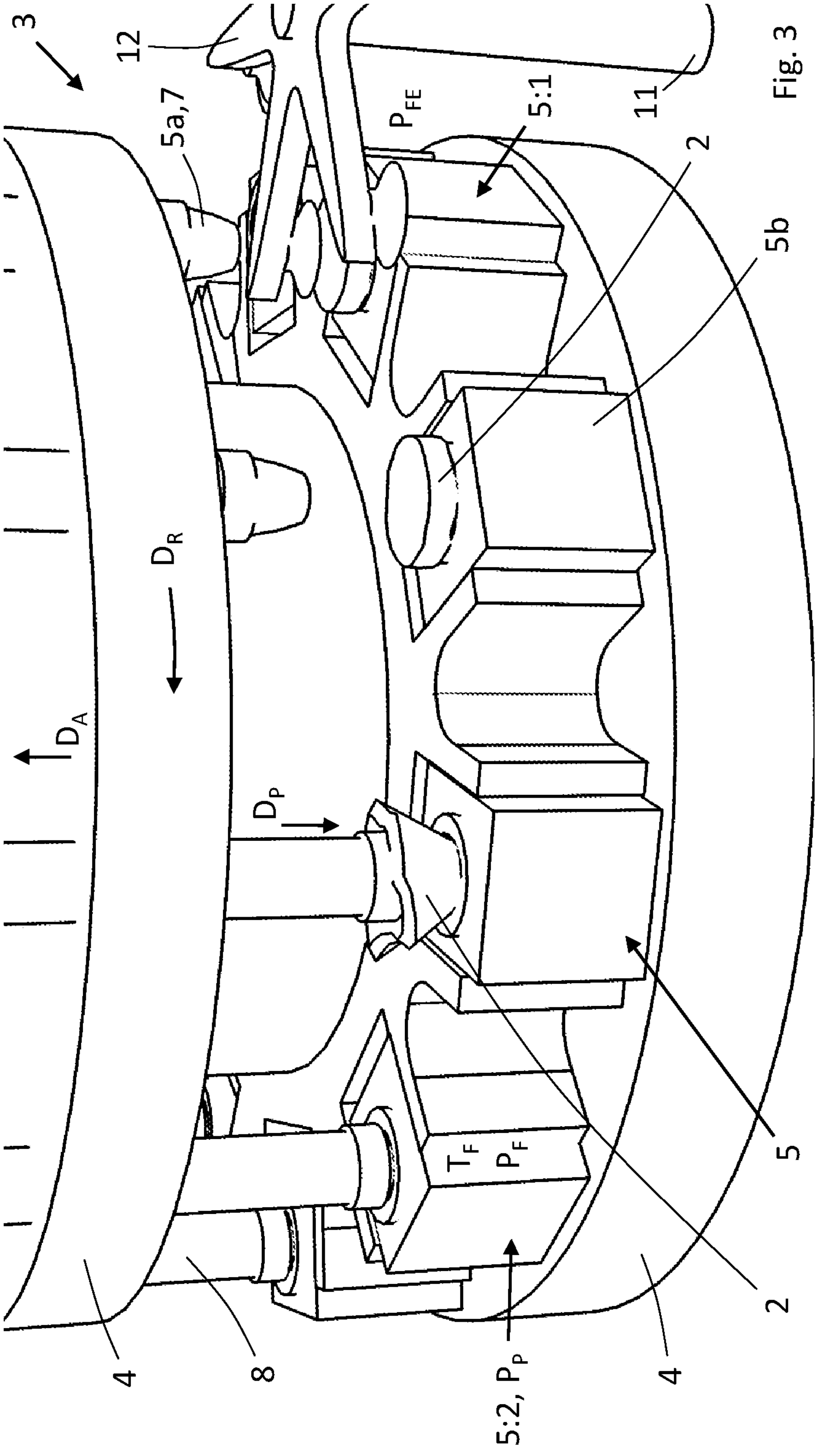
FIG. 3 shows schematically, in a perspective view a section of the rotary forming mould system according to the disclosure.

In FIGS. 1*a-b,* 2*a-b,* 3 and 4, different embodiments of a rotary forming mould system 3 for producing cellulose products 1 from an air-formed cellulose blank structure 2 is schematically shown. The cellulose blank structure 2 may be a pre-formed structure comprising cellulose fibres, where the cellulose fibres are carried and formed to the fibre blank structure 2 by air as carrying medium in an air-forming process.

In the different embodiments of the disclosure, the cellulose products 1 produced in the forming mould system are suitably discrete three-dimensional cellulose products 1. With discrete cellulose products is meant that individual or separated products are formed in the process, which is different from the forming of continuous structures, such as webs or sheets of cellulose material. The formed discrete cellulose products are suitably having a three-dimensional shape, which is different from flat or two-dimensional shapes. Cellulose structures, such as airlaid webs, tissue webs, boards and other flat cellulose fibre webs are defined as two-dimensional structures, which are different from the discrete three-dimensional cellulose products. The flat structures are defined as two-dimensional even if they are provided with embossed surfaces or other surface structures. Examples of three-dimensional products according to the disclosure are disposable cutlery, plates, cups, bowls and caps; three-dimensional packaging structures or packaging inserts; coffee pods; coat-hangers; and meat trays. Any type of cellulose product having a well-defined extension in three dimensions may suitably be produced with the method and system according to the disclosure.

With a cellulose blank structure 2 is meant a fibre web structure produced from cellulose fibres. With air-forming of the cellulose blank structure 2 is meant the formation of a cellulose blank structure in a dry-forming process in which cellulose fibres are air-formed to produce the cellulose blank structure 2. When forming the cellulose blank structure 2 in the air-forming process, the cellulose fibres are carried and formed to the fibre blank structure 2 by air as carrying medium. This is different from a normal papermaking process or a traditional wet-forming process, where water is used as carrying medium for the cellulose fibres when forming the paper or fibre structure. In the air-forming process, small amounts of water or other substances may if desired be added to the cellulose fibres in order to change the properties of the cellulose product, but air is still used as carrying medium in the forming process. The cellulose blank structure 2 may have a dryness that is mainly corresponding to the ambient humidity in the atmosphere surrounding the dry-formed cellulose blank structure 2. As an alternative, the dryness of the cellulose blank structure 2 may be controlled in order to have a suitable dryness level when forming the cellulose products 1.

The cellulose blank structure 2 may be formed of cellulose fibres in a conventional dry-forming process and be configured in different ways. For example, the cellulose blank structure 2 may have a composition where the fibres are of the same origin or alternatively contain a mix of two or more types of cellulose fibres, depending on the desired properties of the cellulose products 1. The cellulose fibres used in the cellulose blank structure 2 are during the forming of the cellulose products 1 strongly bonded to each other with hydrogen bonds. The cellulose fibres may be mixed with other substances or compounds to a certain amount as will be further described below. With cellulose fibres is meant any type of cellulose fibres, such as natural cellulose fibres or manufactured cellulose fibres.

The cellulose blank structure 2 may have a single-layer or a multi-layer configuration. A cellulose blank structure 2 having a single-layer configuration is referring to a cellulose blank structure that is formed of one layer containing cellulose fibres. A cellulose blank structure 2 having a multi-layer configuration is referring to a cellulose blank structure that is formed of two or more layers comprising cellulose fibres, where the layers may have the same or different compositions or configurations. The cellulose blank structure 2 may comprise a reinforcement layer comprising cellulose fibres, where the reinforcement layer is arranged as a carrying layer for other layers of the cellulose blank structure 2. The reinforcement layer may have a higher tensile strength than other layers of the cellulose blank structure 2. This may be useful when one or more layers of the cellulose blank structure 2 have compositions with low tensile strength in order to avoid that the cellulose blank structure 2 will break during the forming of the cellulose products 1. The reinforcement layer with a higher tensile strength acts in this way as a supporting structure for other layers of the cellulose blank structure 2. The reinforcement layer may for example be a tissue layer containing cellulose fibres, an airlaid structure comprising cellulose fibres, or other suitable layer structures.

In the different embodiments according to the disclosure, the air-formed cellulose blank structure 2 suitably has a dry basis weight in the range of 200-3000 $g/m^2$, preferably 300-3000 $g/m^2$, and more preferably 400-3000 $g/m^2$. The dry basis weight values described are web-average values, and tests have shown that these web-average values are suitable when forming the cellulose products 1. It should be understood that the cellulose blank structure 2 is a relatively thick and fluffy structure compared to traditional wet-laid paper or tissue structures. As an example, tests have shown that the density of the cellulose blank structure 2 when arranged in the forming mould system 3 may be lower than 100 $kg/m^3$, which is providing a bulky structure suitable for forming in the rotary forming mould system 3. It should be understood that the density is depending on the dry-forming process and grade of pre-compression of the cellulose blank structure 2 before the forming of the cellulose products 1 in the rotary forming mould system 3. When determining the density, a pressure of 0.5 kPa is applied to a sample piece of the cellulose blank structure 2. The measured thickness of the cellulose blank structure 2 under load together with the basis weight is used for determining the density. The cellulose blank structure 2 is compacted during the forming process, and the cellulose fibres in the three-dimensional cellulose products 1 are strongly bonded to each other with hydrogen bonds, providing a stiff compacted product structure.

As illustrated in FIGS. 1*a-b* and 2*a-b*, 3, and 4, the rotary forming mould system 3 in the illustrated embodiments comprise a base structure 4 and one or more forming moulds 5 attached to the base structure 4. As illustrated in the figures, the system 3 comprises a plurality of forming moulds 5 and any suitable number of forming moulds 5 may be attached to the base structure 4, depending on the design and construction of the system 3. The base structure 4 is arranged to rotate around a rotational axis $A_R$ extending in an axial direction $D_A$, during the forming of the cellulose products 1 from the cellulose blank structure 2. During forming, the one or more forming moulds 5 are rotating with the base structure 4 around the rotational axis $A_R$. In the different illustrated embodiments, the rotary forming mould system 3 is configured for producing discrete three-dimensional cellulose products 1.

The base structure 4 may have any suitable structural configuration for holding the one or more forming moulds 5. The base structure 4 may be formed as a rotating construction of steel or other suitable metals, composite materials, plastic materials or combinations of different materials. The base structure 4 is driven by a suitable power source, such as an electric motor. The electric motor may be connected to the base structure 4 with for example a belt drive, chain drive, gear drive, or other types of drive arrangements.

Each forming mould 5 comprises a first mould part 5*a* and a corresponding second mould part 5*b*, as illustrated in the figures. During rotational movement of the base structure 4 around the rotational axis $A_R$, each first mould part 5*a* is arranged to engage with its corresponding second mould part 5*b* in a pressing direction $D_P$.

The first mould parts 5*a* and/or the second mould parts 5*b* are movably attached to the base structure 4. The first mould parts 5*a* and the second mould parts 5*b* may further be releasably attached to the base structure for a simple removal of the mould parts when needed.

The first mould parts 5*a* and the corresponding second mould parts 5*b* are arranged to interact and engage with each other during the forming of the cellulose products 1, and are shaped to form the cellulose products during the rotational movement of the base structure 4. The first mould parts 5*a* and the second mould parts 5*b* thus have mould shapes corresponding to the shape of the cellulose products to be produced. As an example, the first mould parts 5*a* may be shaped as male moulds and the second mould parts 5*b* may be shaped as corresponding female moulds, or alternatively the first mould parts 5*a* may be shaped as female moulds and the second mould parts 5*b* may be shaped as corresponding male moulds. The female moulds may comprise forming cavities for the cellulose products 1 to be produced, where the cellulose blank structure 2 is arranged in the forming cavity during the forming of the cellulose product 1. The first mould parts 5*a* and the second mould parts 5*b* may alternatively each have both male and female mould sections, depending on the shape of the cellulose products 1 to be produced. Corresponding male and female mould sections of the respective mould parts are interacting with each other during the rotational movement of the base structure 4. In this way, a three-dimensional shape of the cellulose products 1 is established between the mould parts. The respective mould parts may be made of any suitable material, such as for example steel, aluminium, or other metallic materials, or from composite materials.

In the embodiment illustrated in FIGS. 1 *a-b,* 2*a-b,* and 3, the pressing direction $D_P$ is arranged parallel to, or essentially parallel to, the axial direction $D_A$. During rotational movement of the base structure 4 around the rotational axis $A_R$, the first mould parts 5*a* are moving upwards and downwards in the axial direction $D_A$ in a reciprocating movement pattern. The orientation of the pressing direction $D_P$ in the axial direction is providing a compact design of the forming mould system in a radial direction perpendicular to the axial direction $D_A$.

Figure 4:
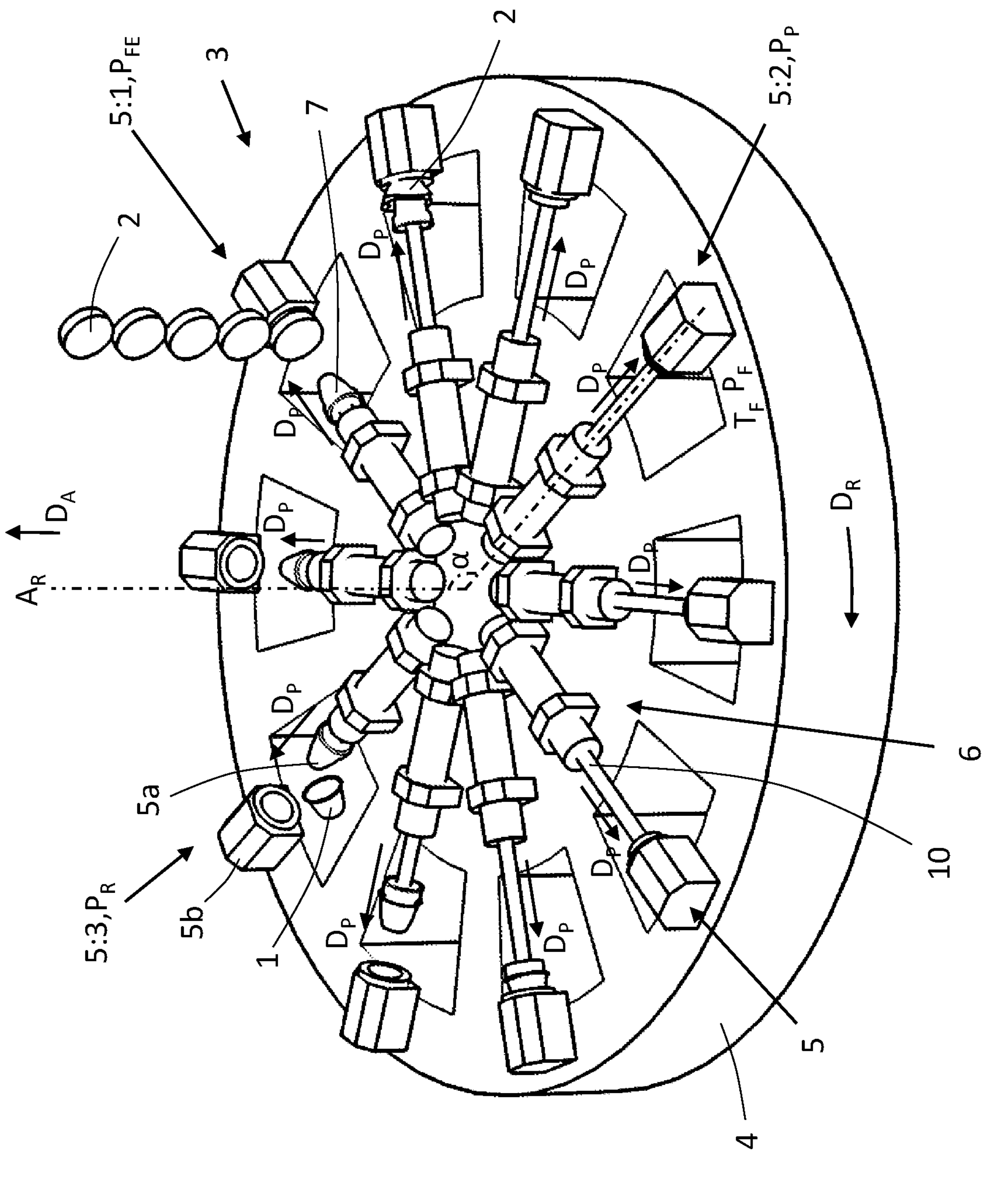
FIG. 4 shows schematically, in a perspective view an alternative embodiment of the rotary forming mould system according to the disclosure.

In the alternative embodiment illustrated in FIG. 4, the pressing direction $D_P$ is arranged at an angle $\alpha$ in relation to the axial direction $D_A$. In the embodiment shown in the figure, the pressing direction $D_P$ is arranged at an angle $\alpha$ of approximately 90°. In further non-illustrated alternative embodiments, the angle $\alpha$ may range between 0° and 180°. The orientation of the pressing direction $D_P$ at an angle $\alpha$ in relation to the axial direction is providing a compact design of the forming mould system in the axial direction $D_A$. It would be possible to stack two or more sets of forming moulds 5 having the configuration illustrated in FIG. 4 on top of each other in the axial direction $D_A$ on a common base structure 4 to provide a stacked forming mould system with high capacity.

During the forming of the cellulose products 1 in the different embodiments described, the cellulose blank structure 2 may be heated to a forming temperature $T_F$ in the range of 100° C. to 300° C., and a forming pressure $P_F$ may be applied to the heated cellulose blank structure 2, in order to establish desired structural properties of the cellulose products 1. The cellulose fibres used in the cellulose blank structure 2 are during the forming of the cellulose products 1 strongly bonded to each other with hydrogen bonds. Tests have shown that a suitable forming pressure $P_F$ for achieving desired product properties is at least 1 MPa, preferably 4-20 MPa.

During forming of the cellulose products 1 in the different embodiments, the rotary forming mould system 3 is configured to heating the cellulose blank structure 2 to the forming temperature $T_F$ in the range of 100° C. to 300° C. with suitable heating means. The cellulose blank structure 2 may for example be pre-heated in a heating unit, exposed to hot air or steam, or alternatively one of or both mould parts may be heated. The rotary forming mould system 3 is further configured to forming the cellulose products 1 from the cellulose blank structure 2 in the rotary forming mould system 3, by pressing the heated cellulose blank structure 2 with the forming pressure $P_F$ of at least 1 MPa, preferably 4-20 MPa, between the first mould part 5*a* and the second mould part 5*b*, as will be further described below.

During forming of the cellulose products 1 the rotary forming mould system 3 is thus in the different embodiments configured to applying the forming pressure $P_F$ on the cellulose blank structure 2 between the first mould part 5*a* and its corresponding second mould part 5*b* through an engaging movement of the first mould part 5*a* in relation to its corresponding second mould part 5*b* in the pressing direction $D_P$. During forming, the one or more forming moulds 5 are configured to rotating with the base structure 4 around the rotational axis $A_R$.

The rotary forming mould system 3 further comprises an actuating mechanism 6 arranged for moving the first mould parts 5*a* and/or the second mould parts 5*b* in relation to each other in the pressing direction $D_P$. Each first mould part 5*a* and/or second mould part 5*b* is movably arranged in the pressing direction $D_P$, and in the embodiments illustrated in the figures, the second mould parts 5*b* are arranged as stationary mould parts, and the first mould parts 5*a* are movably arranged in the pressing direction $D_P$. The first mould parts 5*a* are in the illustrated embodiments arranged to move in a reciprocating manner. In an alternative non-illustrated embodiment, both the first mould parts 5*a* and the second mould parts 5*b* may be movably arranged in the pressing direction $D_P$.

In the embodiment illustrated in FIGS. 1 *a-b,* 2*a-b,* and 3, the actuating mechanism 6 comprises a movable actuating rod 8 for each first mould part 5*a*. The first mould parts 5*a* are attached to lower ends 8*b* of the actuating rods 8. The actuating mechanism 6 further comprises a stationary cam unit 9 arranged for displacing each actuating rod 8 in a reciprocating movement in the pressing direction $D_P$ during rotational movement of the base structure 4 around the rotational axis $A_R$ in a rotational direction $D_R$. Each actuating rod 8 may be provided with an upper surface 8*a,* and the stationary cam unit 9 may be provided with a lower cam surface 9*a,* as illustrated in FIGS. 1 *a-b,* 2*a-b.* During rotational movement of the base structure 4 around the rotational axis $A_R$, the actuating rods 8 are rotating with the base structure 4 and the upper surfaces 8*a* are following a profile of the lower cam surface 9*a,* and the lower cam surface 9*a* is displacing the actuating rods 8 in the axial direction $D_A$. It should be understood that the actuating rods 8 are movably arranged in the pressing direction $D_P$ in relation to the base structure 4, and the actuating rods 8 are movably attached to the base structure 4 with suitable arrangements. The actuating rods 8 may further be spring loaded or comprise similar arrangements for moving the actuating rods 8 upwards in the pressing direction $D_P$. The cam surface 9*a* is through the stationary arrangement of the cam unit 9 pushing the actuating rods 8 downwards during parts of the rotational movement of the base structure 4, and the cam surface 9*a* is allowing the upwards movement of the actuating rods 8 during parts of the rotational movement of the base structure 4. The upwards and downwards movements of the actuating rods 8 may vary depending on the configuration and profile of the cam surface 9*a*. The terms upwards and downwards are related to the positions illustrated in FIGS. 1 *a-b* and 2*a-b*. In an alternative non-illustrated embodiment, the actuating mechanism 6 may instead comprise a movable actuating rod 8 for each second mould part 5*b*.

In the embodiment illustrated in FIGS. 1*a-b,* 2*a-b,* and 3, the actuating rods 8 are arranged in different positions in the pressing direction $D_P$ during the rotational movement of the base structure 4. In a feeding position $P_{FE}$, the actuating rods 8 and the first mould parts 5*a* are arranged in an upper position, allowing a cellulose blank structure 2 to be fed between a first mould part 5*a* and a second mould part 5*b*. In the figures, a first forming mould 5:1 is arranged in the feeding position $P_{FE}$ for receiving a cellulose blank structure 2. In a pressing position $P_P$, the actuating rods 8 and the first mould parts 5*a* are arranged in a lower position, exerting the forming pressure $P_F$ onto the cellulose blank 2 between a first mould part 5*a* and a second mould part 5*b*. In the figures, a second forming mould 5:2 is arranged in the pressing position. In a removal position $P_R$, the actuating rods 8 and the first mould parts 5*a* are arranged into an upper position, allowing the cellulose product 1 to be removed from the forming mould 5. The cellulose products 1 may be removed from the forming mould 5 with pneumatic pressure, gravity, suction or with other suitable removal means. In the figures, a third forming mould 5:3 is arranged in the removal position $P_R$. The terms upper and lower are related to the positions illustrated in FIGS. 1 *a-b* and 2*a-b*.

In the embodiment illustrated in FIG. 4, the actuating mechanism 6 instead comprises an actuator 10 for each first mould part 5*a*. Each actuator 10 is arranged for displacing the first mould part 5*a* in a reciprocating movement in the pressing direction $D_P$ during rotational movement of the base structure 4 around the rotational axis $A_R$ in a rotational direction $D_R$. The actuators 10 may for example be arranged as pneumatic or hydraulic cylinders with pistons that are moving the first mould parts 5*a* between different positions in the pressing direction $D_P$, where the first mould parts 5*a* are attached to the pistons. Alternatively, electric actuators or linear electric actuators may be used as the actuators 10. During rotational movement of the base structure 4 around the rotational axis $A_R$, the actuators 10 are moving in a reciprocating manner. In an alternative non-illustrated embodiment, the actuating mechanism 6 may instead comprise an actuator 10 for each second mould part 5*b*. In the embodiment illustrated in FIG. 4, the pressing direction $D_P$ of each forming mould 5 is arranged at the angle α in relation to the axial direction $D_A$. As illustrated in FIG. 4, the pressing directions $D_P$ of the different forming moulds 5 may differ between the different forming moulds 5, due to the angled configuration of the pressing direction $P_D$ in relation to the axial direction $D_A$. However, the pressing direction $P_D$ of each forming mould 5 is arranged at the angle α in relation to the axial direction $D_A$.

In the embodiment illustrated in FIG. 4, each actuator 10 may be arranged in different positions in the pressing direction $D_P$ during the rotational movement of the base structure 4. In a feeding position $P_{FE}$, the actuators 10 and the first mould parts 5*a* are arranged in an inner position, allowing a cellulose blank structure 2 to be fed between a first mould part 5*a* and a second mould part 5*b*. In the figures, a first forming mould 5:1 is arranged in the feeding position $P_{FE}$ for receiving a cellulose blank structure 2. In a pressing position $P_P$, the actuators 10 and the first mould parts 5*a* are arranged in an outer position, exerting the forming pressure $P_F$ onto the cellulose blank 2 between a first mould part 5*a* and a second mould part 5*b*. In the figures, a second forming mould 5:2 is arranged in the pressing position. In a removal position $P_R$, the actuators 10 and the first mould parts 5*a* are arranged into an inner position, allowing the cellulose product 1 to be removed from the forming mould 5. The cellulose products 1 may be removed from the forming mould 5 with pneumatic pressure, gravity, suction or with other suitable removal means. In the figures, a third forming mould 5:3 is arranged in the removal position $P_R$. The terms inner and outer are related to the positions illustrated in FIG. 4.

Each first mould part 5*a* and/or second mould part 5*b* may in the different embodiments comprise a deformation element 7 arranged to exert the forming pressure $P_F$ on the cellulose blank structure 2 during forming of the cellulose products 1, as illustrated in the figures. The deformation element 7 may be attached to the first mould part 5*a* and/or the second mould part 5*b* with suitable attachment means, such as for example glue or mechanical fastening members. In the embodiments illustrated in the figures, deformation elements 7 are attached to the first mould parts 5*a*. During the forming, the deformation elements 7 are deformed to exert the forming pressure $P_F$ on the cellulose blank structure 2 and through the deformation, an even pressure distribution is achieved even if the cellulose products 1 are having complex three-dimensional shapes or if the cellulose blank structure 2 is having a varied thickness.

The deformation element 7 is being deformed during the forming process, and the deformation element 7 is during forming of the cellulose products 1 arranged to exert the forming pressure $P_F$ on the cellulose blank structure 2. To exert a required forming pressure $P_F$ on the cellulose blank structure 2, the deformation element 7 is made of a material that can be deformed when a force or pressure is applied. For example, the deformation element 7 can be made of an elastic material capable of recovering size and shape after deformation. The deformation element 7 may further be made of a material with suitable properties that is withstanding the high forming pressure $P_F$ and forming temperature $T_F$ levels used when forming the cellulose products 1.

During the forming process, the deformation element 7 is deformed to exert the forming pressure $P_F$ on the cellulose blank structure 2. Through the deformation an even pressure distribution can be achieved, even if the cellulose products 1 are having complex three-dimensional shapes with cut-outs, apertures and holes, or if the cellulose blank structure 2 used is having varying density, thickness, or grammage levels.

Certain elastic or deformable materials have fluid-like properties when being exposed to high pressure levels. If the deformation element 7 is made of such a material, an even pressure distribution can be achieved in the forming process, where the pressure exerted on the cellulose blank structure 2 from the deformation element 7 is equal or essentially equal in all directions between the mould parts. When the deformation element 7 during pressure is in its fluid-like state, a uniform fluid-like pressure distribution is achieved. The forming pressure is with such a material thus applied to the cellulose blank structure 2 from all directions, and the deformation element 7 is in this way during the forming of the cellulose products 1 exerting an isostatic forming pressure on the cellulose blank structure 2. The isostatic forming pressure from the deformation element 7 is establishing a uniform pressure in all directions on the cellulose blank structure 2. The isostatic forming pressure is providing an efficient forming process of the cellulose products 1, and the cellulose products 1 can be produced with high quality even if having complex shapes. According to the disclosure, when forming the cellulose products, the forming pressure $P_F$ may be an isostatic forming pressure of at least 1 MPa, preferably 4-20 MPa.

The deformation element 7 may be made of a suitable structure of elastomeric material, where the material has the ability to establish a uniform pressure on the cellulose blank structure 2 during the forming process. As an example, the deformation element 7 may be made of a massive structure or an essentially massive structure of silicone rubber, polyurethane, polychloroprene, or rubber with a hardness in the range 20-90 Shore A. Other materials for the deformation element 7 may for example be suitable gel materials, liquid crystal elastomers, and MR fluids. The deformation element 7 may also be configured as a thin membrane with a fluid that is exerting the forming pressure on the cellulose blank structure 2.

The rotary forming mould system 3 may further comprise a feeding unit 11 arranged for feeding the cellulose blank structure 2 to the one or more forming moulds 5. In the embodiment illustrated in FIG. 1 *a-b,* 2*a-b,* and 3, the feeding unit comprises a plurality of rotating feeding arms 12 arranged for transporting the cellulose blank structure 2 to the one or more forming moulds 5. Each rotating feeding arm 12 may be provided with suitable means for transporting a cellulose blank structure 2 from a cellulose blank structure source to a position between a first mould part 5*a* and a second mould part 5*b*. The cellulose blank structure source may for example be a stack or similar arrangement of pieces of cellulose blank structure 2 from which the rotating feeding arm 12 can pick a cellulose blank structure 2. The rotating feeding arm 12 may for example be provided with a vacuum system for picking the cellulose blank structure 2 from the source, holding the cellulose blank structure during transportation, and releasing the cellulose blank structure 2 in the forming mould 5. The feeding unit 11 may have other suitable configurations, such as for example a conveyor system, a gravity feeding system, or a pneumatic feeding system.

In connection to the feeding unit 11 further layers, such as for example plastic sheets or laminate structures, may be added to the cellulose blank structure 2, or the cellulose blank structure 2 may be conditioned with steam or water. Further, additives in liquid or powder form may be added to the cellulose blank structure 2 in connection to the feeding unit 11, by for example by sprinkling or spraying.

When forming the cellulose products 1 in the rotary forming mould system 3, the air-formed cellulose blank structure 2 is first provided. The cellulose blank structure 2 is for example arranged in pre-cut pieces as schematically illustrated in the figures. To arrange a piece of pre-cut cellulose blank structure 2 in one of the forming moulds 5, the feeding unit 11 may be used, as illustrated in the embodiment in FIGS. 1*a-b,* 2*a-b,* and 3. The feeding unit 11 is arranged for picking up pieces of cellulose blank structure 2 from for example a stack, and for transporting the pieces to the forming moulds 5. Once the pieces are transported to the forming moulds 5 with the feeding arm 12, they are released into a suitable position between a first mould part 5*a* and a second mould part 5*b*. In the embodiment shown in FIG. 4, the feeding system is only schematically illustrated, and a similar arrangement may be used.

When a piece of cellulose blank structure 2 is arranged between the first mould part 5*a* and the second mould part 5*b,* in the illustrated embodiments, the piece may for example be arranged in a forming cavity of the second mould part 5*b*. The base structure 4 is continuously rotating during the forming process, and the forming moulds 5 are rotating with the base structure in the rotational direction $D_R$. The pieces of cellulose blank structure 2 are sequentially fed into the different forming moulds 5 during the rotational movement of the base structure 4, between the first mould parts 5*a* and the corresponding second mould parts 5*b* at the feeding position $P_{FE}$ of the rotary forming mould system 3.

Due to the rotational movement of the system 3, it should be understood that the feeding of the pieces of cellulose blank structure 2 may take place when the forming moulds 5 are travelling a certain distance, wherein the feeding of the pieces of cellulose blank structure 2 is taking place during the rotational movement of the base structure 4. Thus, the feeding position $P_{FE}$ may not necessarily be a specific point, but rather a travelling distance along which the piece of cellulose blank structure 2 is fed into the forming mould 5.

As illustrated in the figures a first forming mould 5:1 is, during the rotational movement of the base structure 4 and the forming moulds 5 in the rotational direction $D_R$, arranged in the feeding position $P_{FE}$ for receiving a piece of cellulose blank structure 2. When the piece of cellulose blank structure 2 is arranged in the first forming mould 5:1, in the position between the first mould part 5*a* and its corresponding second mould part 5*b,* the first forming mould 5:1 is further transported together with the piece of cellulose blank structure 2 from the feeding position $P_{FE}$ to the pressing position $P_P$. When a forming mould 5 has left the feeding position $P_{FE}$, the following forming mould 5, will be passing the feeding position $P_{FE}$ and ready for receiving a following piece of cellulose blank structure 2. In the feeding position $P_{FE}$, the first mould parts 5*a* are through the actuating mechanism 6 arranged in a position away from the second mould parts 5*b* in the pressing direction $D_P$, for an efficient feeding of the pieces of cellulose blank structures 2 in connection to a forming cavity of the second mould part 5*b*.

During the rotational movement of the base structure 4 and the forming moulds 5, from the feeding position $P_{FE}$ towards the pressing position $P_P$ the actuating mechanism 6 is moving the first mould parts 5*a* in the pressing direction $D_P$ towards the second mould parts 5*b*. When a forming mould 5 has reached the pressing position $P_P$, during the rotational movement of the base structure 4 and the forming moulds 5, as illustrated with a second forming mould 5:2 in the figures, the forming pressure $P_P$ is applied to the piece of cellulose blank structure 2 between the first mould part 5*a* and the corresponding second mould part 5*b*.

In the pressing position $P_P$, the actuating mechanism has moved the first mould part 5*a* in the pressing direction $D_P$ into a closest position in relation the second mould part 5*b*. When forming the cellulose products 1 from the piece of cellulose blank structure 2 in the rotary forming mould system 3, the forming pressure $P_F$ is thus applied to the piece of cellulose blank structure 2 between the first mould part 5*a* and its corresponding second mould part 5*b* through an engaging movement of the first mould part 5*a* in relation to its corresponding second mould part 5*b* in the pressing direction $D_P$. The forming pressure $P_F$ may be applied during a pre-determined time, which may vary depending on the type of products produced in the system, the forming temperature $T_F$, and the forming pressure $P_F$. During further rotation of the base structure 4 and the forming moulds 5, the forming moulds 5 are moving from the pressing position $P_P$ to the removal position $P_R$.

Due to the rotational movement of the system 3, it should be understood that the pressing of the cellulose products 1 may take place when the forming moulds 5 are travelling a certain distance, wherein the forming pressure $P_F$ is applied to the piece of cellulose blank 2 during the rotational movement of the base structure 4. Thus, the pressing position $P_P$ may not necessarily be a specific point, but rather a travelling distance along which the forming pressure $P_F$ is applied.

During the rotational movement of the base structure 4 and the forming moulds 5, from the pressing position $P_P$ towards the removal position $P_R$ the actuating mechanism 6 is moving the first mould parts 5*a* in the pressing direction $D_P$ away from the second mould parts 5*b*. When a forming mould 5 has reached the removal position $P_R$, during the rotational movement of the base structure 4 and the forming moulds 5, as illustrated with a third forming mould 5:3 in the figures, the formed cellulose products 1 are removed from the forming mould with suitable removal means. In the removal position $P_R$, the actuating mechanism 6 has moved the first mould part 5*a* in the pressing direction $D_P$ into a position away from the second mould part 5*b* to facilitate the removal of the cellulose products 1. During further rotation of the base structure 4 and the forming moulds 5, the forming moulds 5 are moving from the removal position $P_R$ back to the feeding position $P_{FE}$.

Due to the rotational movement of the system 3, it should be understood that the removal of the cellulose products 1 from the forming moulds 5 may take place when the forming moulds 5 are travelling a certain distance, wherein the removal of the cellulose products 1 are taking place during the rotational movement of the base structure 4. Thus, the removal position $P_R$ may not necessarily be a specific point, but rather a travelling distance along which the cellulose products 1 are removed from the forming mould 5.

When producing the cellulose products 1 in the rotary forming mould system 3, the provided cellulose blank structure 2 is air-formed from cellulose fibres. The forming of the cellulose blank structure 2 may take place in an air-forming unit or similar arrangement, and if desired the cellulose blank structure 2 may be arranged in rolls or sheets before being transported to the rotary forming mould system 3. Further, the air-forming may take place in direct connection to the rotary forming mould system 3 and thus the air forming unit may be arranged in line with the rotary forming mould system 3. The cellulose blank structure 2 is then being transported to the rotary forming mould system 3, and the cellulose blank structure 2 is fed to a position between a first mould part 5*a* and a second mould part 5*b* with for example the feeding unit 11 illustrated in FIGS. 1*a-b,* 2*a-b,* and 3. The transportation of the cellulose blank structure 2 in the rotary forming mould system 3 may be accomplished through the interaction between the cellulose blank structure 2 and the mould parts.

The first mould part 5*a* may comprise a first cutting edge, and/or the second mould part 5*b* a second cutting edge, for cutting the cellulose blank structure 2 during the forming of the cellulose products 1. The first cutting edge and the second cutting edge may have a shape or contour corresponding to the shape or contour of the cellulose products 1 to be produced. The first cutting edge may be configured to interact with the second cutting edge for removing parts of the cellulose blank structure 2 that are not part of the formed cellulose products 1. The first cutting edge may be arranged in an interacting relationship to the second cutting edge during movements of the first mould parts 5*a* and/or the second mould parts 5*b* in the pressing direction $D_P$. The cutting edges may be arranged for removing unwanted residual cellulose fibres from the cellulose blank structure, and the cut residual cellulose fibres may be reused for forming new cellulose blank structures if desired. In an alternative configuration, only one of the mould parts may be arranged with a cutting edge, where the cutting edge may be arranged to interact with a part of the other mould part for cutting residual cellulose fibres from the cellulose blank structure. The cutting edge may have a shape or contour corresponding to the shape or contour of the cellulose products 1 to be produced.

The cellulose blank structure 2 may comprise one or more additives that are altering the mechanical, hydrophobic, and/or oleophobic properties of the cellulose products 1. Tests have shown that if the cellulose blank structure 2 contains at least 70% of cellulose fibres, desired mechanical properties of the cellulose products 1 can be achieved. In order to achieve the desired properties of the formed cellulose products 1, the cellulose fibres should be strongly bonded to each other through fibril aggregation in a way so that the resulting cellulose products 1 will have good mechanical properties. The additives used may therefore not impact the bonding of the cellulose fibres during the forming process to a high extent.

As a non-limiting example, the cellulose blank structure may 2 have a material composition of 70-99.9% dry wt cellulose fibres and 0.1-30% dry wt of the one or more additives. In another embodiment, the cellulose blank structure 2 may have a material composition of 80-99.9% dry wt cellulose fibres and 0.1-20% dry wt of the one or more additives. In a further embodiment, the cellulose blank structure 2 may have a material composition of 90-99.9% dry wt cellulose fibres and 0.1-10% dry wt of the one or more additives. Depending on the amount of cellulose fibres and additives used in the cellulose blank structure 2, the cellulose products 1 can have different properties.

The one or more additives of the cellulose blank structure 2 may be, as a non-limiting example, starch compounds, rosin compounds, butanetetracarboxylic acid, gelatin compounds, alkyl ketene dimer (AKD), Alkenyl Succinic Anhydride (ASA), and/or flourocarbons. These additives are commonly used in the forming of cellulose products and are therefore not described in detail. Starch compounds, gelatin compounds, butanetetracarboxylic acid, and fluorocarbons may for example be used for altering the mechanical properties, such as strength or stiffness, of the cellulose product. Rosin compounds, alkyl ketene dimer (AKD), Alkenyl Succinic Anhydride (ASA), and fluorocarbons may for example be used for altering the hydrophobic properties of the cellulose products. Fluorocarbons may for example be used also for altering the oleophobic properties of the cellulose products 1. The one or more additives of the cellulose blank structure 2 may be added to the cellulose blank structure 2 before forming the cellulose products 1, for example when dry-forming the cellulose blank structure 2.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose product
2: Cellulose blank structure
3: Rotary forming mould system
4: Base structure
5*a:* First mould part
5*b:* Second mould part
6: Actuating mechanism
7: Deformation element
8: Actuating rod
8*a:* Upper surface, Actuating rod
8*b:* Lower end, Actuating rod
9: Cam unit
9*a:* Lower cam surface, Cam unit
10: Actuator
11: Feeding unit
12: Feeding arm

The invention claimed is:

1. A method for forming cellulose products from an air-formed cellulose blank structure in a rotary forming mould system, wherein the rotary forming mould system comprises a base structure and a plurality of forming moulds attached to the base structure, wherein the base structure is arranged to rotate around a rotational axis ($A_R$) extending in an axial direction ($D_A$), wherein each forming mould comprises a first mould part and a corresponding second mould part, wherein during rotational movement of the base structure around the rotational axis ($A_R$) each first mould part is arranged to engage with its corresponding second mould part in a pressing direction ($D_P$), wherein the method comprises steps of;

providing pre-cut or pre-formed pieces of air-formed cellulose blank structure, wherein the cellulose blank structure is a fibre web structure consisting of 90-99.9% dry wt. cellulose fibres and 0.1-10% dry wt. of one or more additives selected from the group consisting of starch compounds, rosin compounds, butanetetracarboxylic acid, gelatin compounds, alkyl ketene dimer (AKD), and Alkenyl Succinic Anhydride (ASA), wherein the one or more additives are altering the mechanical, hydrophobic, and/or oleophobic properties of the cellulose products, wherein the pre-cut or pre-formed pieces of air-formed cellulose blank structure are provided by forming a cellulose blank structure in an air-forming unit, wherein the cellulose fibres are carried and formed to the cellulose blank structure by air as carrying medium in the air-forming unit, wherein the cellulose fibres during the forming of the cellulose products are strongly bonded to each other with hydrogen bonds, wherein the air forming unit is arranged in line with the rotary forming mould system and the air-forming takes place in direct connection to the rotary forming mould system;

arranging a pre-cut or pre-formed piece of cellulose blank structure in a position between a first mould part and its corresponding second mould part by feeding the pre-cut or pre-formed pieces of cellulose blank structure to the forming moulds using a cellulose blank structure feeding unit, and adding steam or liquid water or said 0.1-10% dry wt. of the one or more additives in liquid or powder form to the pre-cut or pre-formed pieces of cellulose blank structure in connection to the cellulose blank structure feeding unit;

forming the cellulose products from the cellulose blank structure in the rotary forming mould system, by applying a forming pressure ($P_F$) on the cellulose blank structure between the first mould part and its corresponding second mould part through an engaging movement of the first mould part in relation to its corresponding second mould part in the pressing direction ($D_P$), wherein during forming the one or more forming moulds are rotating with the base structure around the rotational axis ($A_R$), wherein during forming the method further comprises the steps; heating the cellulose blank structure to a forming temperature in the range of 100° C. to 300° C.; and applying the forming pressure on the heated cellulose blank structure, wherein the forming pressure is at least 1 MPa.

2. A method according to claim 1, wherein the pressing direction ($D_P$) is arranged parallel to, or essentially parallel to, the axial direction ($D_A$).

3. A method according to claim 1, wherein the pressing direction ($D_P$) is arranged at an angle (α) in relation to the axial direction ($D_A$), wherein the angle (α) is in the range 0°-180°.

4. A method according to claim 1, wherein the first mould part and/or the second mould part comprises a deformation element arranged to exert the forming pressure ($P_F$) on the cellulose blank structure during forming of the cellulose products.

5. A method according to claim 4, wherein the forming pressure ($P_F$) is an isostatic forming pressure of at least 1 MPa.

6. A method according to claim 1, wherein the cellulose blank structure has a dry basis weight in the range of 200-3000 g/m$^2$.

7. A method according to claim 1, wherein the forming pressure ($P_F$) is 4-20 MPa.

8. A method according to claim 5, wherein the forming pressure ($P_F$) is 4-20 MPa.

9. A method according to claim 6, wherein the cellulose blank structure has a dry basis weight in the range of 300-3000 g/m$^2$.

10. A method according to claim 6, wherein the cellulose blank structure has a dry basis weight in the range of 400-3000 g/m$^2$.

11. A method for forming cellulose products from an air-formed cellulose blank structure in a rotary forming mould system, wherein the rotary forming mould system comprises a base structure and a plurality of forming moulds attached to the base structure, wherein the base structure is arranged to rotate around a rotational axis ($A_R$) extending in an axial direction ($D_A$), wherein each forming mould comprises a first mould part and a corresponding second mould part, wherein during rotational movement of the base structure around the rotational axis ($A_R$) each first mould part is arranged to engage with its corresponding second mould part in a pressing direction ($D_P$), wherein the method comprises steps of;

providing pre-cut or pre-formed pieces of air-formed cellulose blank structure, wherein the cellulose blank structure is a fibre web structure consisting of 90-99.9% dry wt. cellulose fibres and 0.1-10% dry wt. of one or more additives selected from the group consisting of starch compounds, rosin compounds, butanetetracarboxylic acid, gelatin compounds, alkyl ketene dimer (AKD), and Alkenyl Succinic Anhydride (ASA), wherein the one or more additives are altering the mechanical, hydrophobic, and/or oleophobic properties of the cellulose products, wherein the pre-cut or pre-formed pieces of air-formed cellulose blank structure are provided by forming a cellulose blank structure in an air-forming unit, wherein the cellulose fibres during the forming of the cellulose products are strongly bonded to each other with hydrogen bonds, wherein the cellulose fibres are carried and formed to the cellulose blank structure by air as carrying medium in the air-forming unit, wherein the air forming unit is arranged in line with the rotary forming mould system and the air-forming takes place in direct connection to the rotary forming mould system;

arranging a pre-cut or pre-formed piece of cellulose blank structure in a position between a first mould part and its corresponding second mould part by feeding the pre-cut or pre-formed pieces of cellulose blank structure to the forming moulds using a cellulose blank structure feeding unit, and adding steam or liquid water or said 0.1-10% dry wt. of the one or more additives in liquid or powder form to the pre-cut or pre-formed pieces of cellulose blank structure in connection to the cellulose blank structure feeding unit;

forming the cellulose products from the cellulose blank structure in the rotary forming mould system, by applying a forming pressure ($P_F$) on the cellulose blank structure between the first mould part and its corresponding second mould part through an engaging movement of the first mould part in relation to its corresponding second mould part in the pressing direction ($D_P$), such that the cellulose blank structure is compacted during the forming process and the cellulose fibres in the three-dimensional cellulose products are strongly bonded to each other with hydrogen bonds, wherein during forming the method further comprises the steps; heating the cellulose blank structure to a forming temperature in the range of 100° C. to 300° C.; and applying the forming pressure on the heated cellulose blank structure, wherein the forming pressure is at least 1 MPa and wherein during forming the one or more forming moulds are rotating with the base structure around the rotational axis ($A_R$).

* * * * *